(12) United States Patent
Valentini

(10) Patent No.: US 12,156,625 B2
(45) Date of Patent: Dec. 3, 2024

(54) METHOD FOR OPERATION OF AN ELECTRONIC DEVICE EQUIPPED WITH TWO OR MORE BATTERY PACKS AND RESPECTIVE ELECTRONIC DEVICE

(71) Applicant: Guido Valentini, Milan (IT)

(72) Inventor: Guido Valentini, Milan (IT)

( * ) Notice: Subject to any disclaimer, the term of this patent is extended or adjusted under 35 U.S.C. 154(b) by 556 days.

(21) Appl. No.: 17/501,089

(22) Filed: Oct. 14, 2021

(65) Prior Publication Data

US 2022/0160193 A1 May 26, 2022

(30) Foreign Application Priority Data

Nov. 26, 2020 (EP) ..................................... 20210027

(51) Int. Cl.
*H01M 10/44* (2006.01)
*A47L 5/24* (2006.01)
*A47L 9/28* (2006.01)
*H01M 10/46* (2006.01)
(Continued)

(52) U.S. Cl.
CPC ............... *A47L 5/24* (2013.01); *A47L 9/2884* (2013.01); *H01M 10/44* (2013.01); *H01M 50/209* (2021.01); *H02J 7/0045* (2013.01)

(58) Field of Classification Search
CPC ...... H02J 7/0025; H02J 7/0013; H02J 7/0045; H02J 7/00712; H02J 7/00714; H01M 10/44; H01M 10/46; H01M 50/209; H01M 10/443; H01M 10/482; A47L 9/2884; A47L 5/24
USPC ........ 320/107, 114, 115, 116, 118, 138, 150, 320/153
See application file for complete search history.

(56) References Cited

U.S. PATENT DOCUMENTS

| | | | |
|---|---|---|---|
| 2007/0148539 A1 | 6/2007 | Pellenc | |
| 2011/0309681 A1* | 12/2011 | Kamijima | ......... H02J 7/007194 307/66 |
| 2012/0013304 A1 | 1/2012 | Murase et al. | |

(Continued)

FOREIGN PATENT DOCUMENTS

| | | | | |
|---|---|---|---|---|
| EP | 2645526 A2 * | 10/2013 | .......... | H01M 10/441 |
| JP | 2011 121415 A | 6/2011 | | |
| WO | 2020/071734 A1 | 4/2020 | | |

OTHER PUBLICATIONS

English language Abstract of JP2011121415A.

*Primary Examiner* — Edward Tso
(74) *Attorney, Agent, or Firm* — Ware, Fressola, Maguire & Barber LLP

(57) ABSTRACT

The invention refers to an electronic device (10; 10a; 10b) comprising two or more battery packs (18a, 18b), an electric motor (16) which is operated by electric energy from at least one of the battery packs (18a; 18b) at a time, and an electronic control unit (20) for controlling operation of the electric motor (16). It is suggested that the electronic control unit (20) is adapted for switching operation of the electric motor (16) cyclically and consecutively from at least one battery pack (18a; 18b) to at least one other battery pack (18b; 18a). Switching form one operation cycle to the next operation cycle may be effected depending on the current temperature (T) of the at least one battery pack (18a, 18b), on an electric current (1) drawn from the at least one battery pack (18a, 18b) during the current operation cycle, or on a duration (t) of continuous operation of the at least one battery pack (18a, 18b) during the current operation cycle.

18 Claims, 4 Drawing Sheets

(51) Int. Cl.
*H01M 50/209* (2021.01)
*H02J 7/00* (2006.01)

(56) References Cited

U.S. PATENT DOCUMENTS

2013/0257386 A1 10/2013 Kern et al.
2020/0333402 A1 10/2020 Jan

* cited by examiner

METHOD FOR OPERATION OF AN ELECTRONIC DEVICE EQUIPPED WITH TWO OR MORE BATTERY PACKS AND RESPECTIVE ELECTRONIC DEVICE

BACKGROUND OF THE INVENTION

1. Field of Invention

The present invention refers to an electronic device which comprises two or more battery packs and an electric motor which is operated by electric energy from at least one of the battery packs at a time. The electronic device further comprises an electronic control unit for controlling operation of the electric motor.

2. Description of Related Art

The invention further refers to a method for controlling operation of an electric motor of an electronic device. The electronic device comprises two or more battery packs. The electric motor is operated by electric energy from at least one of the battery packs.

Battery-powered or battery-operated electronic devices are increasingly replacing electronic devices that have a mains power connection. The advantages of battery-powered electronic devices are independence from a mains connection (operation in rooms without a mains connection or outdoors is also possible) and greater freedom of movement (there is no power cord to restrict or obstruct the movement of the electronic device). A disadvantage of known battery-powered electronic devices is the lower power they are capable of delivering over a certain period of time. The reason for this is the fact that drawing a high current from a battery pack over a long period of time can cause the battery pack to heat up. Battery management systems (BMS) making an integral part of the battery packs regulate the batteries' properties during operation (i.e. energy output) in such a way that specified temperatures of the battery packs are not exceeded. To prevent a battery pack from heating up excessively, the current drawn (and therefore the power) is limited by the BMS if the temperature of the battery pack rises. The limitation of power during operation of the battery pack is therefore not a direct consequence of the technical or chemical properties of the battery cells, but rather a consequence of the protection functionality of the BMS, which makes an integral part of the battery pack.

For example, Li-Ion batteries can be generally used in a temperature range of approximately −10° C. to +55° C. However, negative effects on the battery's service life already occur at operating temperatures of above 35° C. For this reason, the BMS reduces the output current already at temperatures below 55° C. to prevent excessive heating of the battery pack. In practice, however, for example during continuous operation of a battery-powered electronic device this means that after just a few minutes, only a reduced power is available for the operation of the device.

SUMMARY OF THE INVENTION

It is an object of the present invention to solve the above drawbacks and to improve operation of battery-powered electronic devices.

This object is solved by an electronic device featuring two or more battery packs, an electric motor which is operated by electric energy from at least one of the battery packs at a time, as well as by a method for controlling operation of an electric motor of an electronic device featuring steps for implementing the same. In particular, regarding the electronic device, it is suggested that the electronic control unit is adapted for switching operation of the electric motor cyclically and consecutively from at least one battery pack to at least one other battery pack. Regarding the operation method, it is suggested that operation of the electric motor is cyclically and consecutively switched from at least one battery pack to at least one other battery pack.

According to the invention, the electric motor is operated in consecutive cycles, wherein during two consecutive cycles the electric motor is operated by electric energy from two different battery packs, during the first cycle by electric energy from a first battery pack and during the second cycle by electric energy from a second battery pack. It is emphasized that two consecutive cycles do not necessarily have to have the same duration. Of course, it would be possible to switch operation of the electric motor from one battery pack to another after a certain, possibly pre-defined, amount of operation time with the first battery pack. However, it would also be possible to switch operation of the electric motor from one battery pack to another independently from the operation time with the first battery pack. Instead, a current value of at least one characteristic parameter of at least one of the battery packs, preferably of the first battery pack currently providing electric energy to the electric motor, could be determined during operation of the electric motor, and the operation of the electric motor could be switched to the other battery pack if the determined at least one characteristic parameter has a certain, possibly pre-defined, current value. This will be described in further detail below.

The operation cycle may be in the range of seconds, preferably tens of seconds, or minutes. During the operation cycle all other battery packs currently not in operation are able to cool down and to come closer to their original electric characteristics (e.g. voltage, current, output power), ideally to almost or even completely regain their original electric characteristics. An operation cycle of as little as 30 sec has proved to be sufficient to cool down the at least one inactive battery pack and to almost regain its original electric characteristics. Of course, operation cycles shorter or longer than 30 sec would be possible, too.

The advantage of the invention is that operation of the electric motor may be switched from one battery pack to another well before the first battery pack has a significantly reduced output current and/or output voltage (and output power). The reduction of the output current and/or voltage may be a result of technical and/or physical and/or chemical characteristics of the battery cells of the battery pack. Alternatively, the reduction of the output current and/or voltage may be a result of an increasing temperature of the battery pack and may be caused by the BMS of the battery pack. After having switched to the other battery pack, the electric motor can be operated for another relatively long period of time with full power from the other battery pack. Meanwhile, the first battery pack can cool down, regain its original electric (and/or physical and/or chemical) properties and prepare to take over operation of the electric motor later on with full output power again. With this invention, the electric motor can be continuously operated for a very long amount of time at full power or near full power, without running the risk that the output current and/or the output voltage (and thus the output power) of the battery pack currently providing electric current and operating the electric motor is reduced with ongoing operation time, for instance caused by the BMS in order to protect the battery pack.

A significant reduction of the output current or voltage may be reached if they decrease by more than 30%. In other embodiments, a significant reduction of the output current or voltage may be reached if they decrease by more than 20%. In yet another embodiment, a significant reduction of the output current or voltage may be reached if they decrease by more than 10%. It is noted that in most cases the output current and the output voltage will reduce by different percentages. Therefore, a threshold of significance may be set to different values for the output voltage and the output current. For example, a significant reduction of the voltage may comprise a reduction by more than 10% and a significant reduction of the current may comprise a reduction by more than 20%. The significance of reduction of the output power will usually be higher because it results from the product of voltage and current. Therefore, a significant reduction of the output power may be reached if it decreases by more than 35%, preferably by more than 25%, particularly preferable by more than 20%. As mentioned above, it is advantageous to switch from one battery pack to another before the output power of the currently used at least one battery pack is reduced by more than the indicated significant reduction.

A preferred instance for switching form at least one battery pack of the electric device to at least one other battery pack of the electronic device is when at least one current value of an electric characteristic of the battery pack currently in use has not yet significantly decreased in respect to the original value of that electric characteristic. To that end, switching to the other unused battery pack with the original electric characteristic may be effected without the user of the electronic device noticing. For example, if an electronic device is operated with a first battery pack while the output voltage reduces from 18.0V to 17.8V and then switched to another battery pack having the original voltage of 18.0V, the switching and the rise of the output voltage of the batteries from 17.8V of the first battery to 18.0V of the other battery will not be noticed by the user of the electric device. If, however, the first battery pack is used until the output voltage reaches 14.5V, the following switching and the rise of the output voltage of the batteries from 14.5V of the first battery to 18.0V of the other battery will most probably be noticed by the user of the electric device, e.g. through a noticeable increase of the speed of an electric motor or the like. Thus, the instant for switching from one battery pack to another is preferably selected such that switching may be effected unnoticed by the user of the electric device.

In a simple embodiment, the electronic device has only two battery packs and operation of the electric motor is switched back and forth between the two batteries. However, it would just as well be possible that the electronic device has more than two battery packs, for example three, four or five battery packs, which may increase the amount of time available for cooling down those battery packs which currently do not provide current to the electric motor. Furthermore, in case of more than two battery packs, it would also be possible that more than one battery pack provides current and operates the electric motor. For example, with three battery packs, the electric motor may be operated in a first cycle by two of the battery packs, and in a subsequent second cycle by only one battery pack and so on. It would even be possible that the electric motor is operated by two battery packs at all times and that switching of the battery packs is effected offset to one another. For example, in a first cycle, batteries #1 and #2 operate the electric motor, in a second cycle batteries #1 and #3 operate the electric motor, in a third cycle batteries #2 and #3 operate the electric motor and then operation is switched back to the first cycle. According to a further example, with four battery packs, the electric motor may be operated in a first cycle by two of the battery packs, and in a subsequent second cycle by the other two battery packs and so on. Of course, with four battery packs, the above described offset operation of the electric motor would also be possible resulting in the following operating batteries at six consecutive cycles: #1, #2-#1, #3-#2, #3-#2, #4-#3, #4-#1, #4. Alternatively, the above described offset operation of the electric motor could also comprise the following operating batteries at four consecutive cycles: #1, #2-#1, #3-#2, #4-#3, #4. Many other variations of the general idea of cyclically and consecutively switching operation of the electric motor from at least one of the battery packs of the electronic device to at least one other battery pack are conceivable According to a preferred embodiment of the present invention, it is suggested that the electronic device comprises at least one sensor adapted for determining a current (i.e. momentaneous or present) value of at least one characteristic parameter of at least one of the battery packs and for forwarding the at least one determined characteristic parameter to the electronic control unit. The electronic control unit is adapted for switching operation of the electric motor cyclically and consecutively from at least one battery pack to at least one other battery pack, wherein the switching depends on the determined current value of the at least one characteristic parameter of the at least one battery pack. To this end, one or more characteristic parameters of the at least one battery pack are monitored by means of a respective sensor. The characteristic parameters are in particular electronic properties of the battery packs, e.g. an electric current drawn from the battery pack during an operation cycle of the electric motor, a voltage supplied by the battery pack, an electric resistance of the battery pack or the like. Alternatively, the at least one sensor could also be adapted for determining non-electric properties of the at least one battery pack. The current value of the at least one characteristic parameter of at least one of the battery packs, which is determined by the at least one sensor, may then be used for determining an appropriate point in time for switching operation of the electric motor from the at least one battery pack to the at least one other battery pack.

Preferably, the at least one sensor is adapted for determining a current value of at least one characteristic parameter indicative of the current temperature of the at least one battery pack. The electronic control unit is adapted for determining the current temperature of the at least one battery pack based on the determined current value of the at least one characteristic parameter indicative of the current temperature of the at least one battery pack. The electronic control unit is adapted for switching operation of the electric motor cyclically and consecutively from the at least one battery pack to the at least one other battery pack depending on the determined current temperature value of the at least one battery pack. To this end it is suggested that the switching of the operation of the electric motor from the at least one battery pack to the at least one other battery pack is effected depending on the current temperature of the at least one battery pack. The temperature of the at least one battery pack is not determined directly by means of one or more temperature sensors but instead from a characteristic parameter of the at least one battery pack, which is indicative of the temperature of the at least one battery pack. Determination of the temperature may be effected by calculation or by estimation of the temperature from the characteristic parameter. To this end, the electronic control unit may access a characteristic map in which electrical properties of the battery packs and the relationship between the electrical properties and the current temperature of the battery packs are stored. Furthermore, the calculation can be effected with the help of one or more equations which reflect the interrelationships between the electrical properties and the current temperature of the battery packs. In case the at least one battery pack comprises more than one battery pack, it may be sufficient to determine the temperature of only one of the battery packs.

Preferably, switching of the operation of the electric motor from the at least one battery pack to the at least one other battery pack is effected if the temperature of the at least one battery pack reaches or exceeds a given temperature threshold, preferably a pre-defined temperature threshold. The temperature threshold is defined based on the characteristics of the battery packs, their battery cells and/or their BMS.

For instance, if the battery cells of a battery pack are of the Li-Ion type, the output power of the battery pack at ambient temperature and during continuous operation will decrease more or less linearly over time, e.g. by 4-5% per 5° K. If the output power of a battery pack at the starting temperature of T=0° K above ambient temperature (approximately 25° C.) is 300 W, the output power may decrease by approximately 12.5 W each increase of the battery pack temperature by 5° K. If an output power of below 250 W is to be avoided, the battery pack may be deactivated and operation of the electric motor switched to another battery pack if a temperature of 20° K above ambient temperature, i.e. approximately 45° C., has been reached or exceeded. In that example the temperature threshold is predefined at 45° C. for each operation cycle. Of course, different threshold values may be defined for different operation cycles and/or for different battery packs.

It is suggested that the at least one sensor comprises at least one electric current sensor for sensing a current electric current value of the at least one battery pack. The electronic control unit is adapted for determining an electric current drawn over time from the at least one battery pack during an operation cycle of the electric motor. The electronic control unit is adapted for determining the current temperature value of the at least one battery pack based on the determined electric current drawn over time from the at least one battery pack during the operation cycle of the electric motor. In order to determine the electric current drawn over time during an operation cycle of the at least one battery pack, the determined current values of the electric current drawn from the at least one battery pack is integrated over time. The overall amount of electric current drawn from the at least one battery pack over time is indicative of the current temperature of the at least one battery pack. The higher the value of electric current drawn from the at least one battery pack over time is, the higher the temperature of the at least one battery pack will be.

In another embodiment it is suggested that the at least one sensor comprises at least one temperature sensor for determining a current (i.e. momentaneous or present) temperature value of the at least one battery pack. The electronic control unit is adapted for switching operation of the electric motor cyclically and consecutively from one battery pack to another battery pack depending on the determined current temperature value of the at least one battery pack. In this embodiment, the temperature of the at least one battery pack is determined directly by means of one or more temperature sensors. A separate sensor may be assigned to each of the battery packs. Alternatively, a common sensor may be used for all battery packs.

Of course, when determining the points in time for switching operation of the electric motor from at least one battery pack to at least one other battery pack, the ambient temperature may be taken into consideration, too. In that case, the electronic device, in particular its electronic control unit, is provided with a temperature sensor for measuring the current ambient temperature, and for forwarding the measured current ambient temperature value to the electronic control unit for further processing.

According to another embodiment of the invention, it is suggested that the electronic device comprises a timer which is reset at the beginning of each operation cycle of the electric motor and runs during the operation cycle of the electric motor. The electronic control unit is adapted for monitoring the current value of the timer during the operation cycle of the electric motor and to switch operation of the electric motor from the at least one battery pack currently operating the electric motor to at least one other battery pack after the timer has reached or exceeded a pre-defined timer value. The timer may make an integral part of the electronic control unit. It may be realized in hardware or in software. After switching operation of the electric motor to at least one other batter pack, and thus starting a new operation cycle, the timer is reset, preferably to zero, and restarted again.

For instance, if the battery cells of a battery pack are of the Li-Ion type, the output power of the battery pack at ambient temperature and during continuous operation will decrease more or less linearly over time, e.g. by 4-5% per minute. If the output power of a battery pack at the starting time t=0 is 300 W, the output power may decrease by approximately 12, 5 W each minute. If an output power of below 250 W is to be avoided, the battery pack may be deactivated and operation of the electric motor switched to another battery pack after 4 minutes. In this example the time threshold is predefined at 4 minutes for each operation cycle. Of course, different threshold values may be defined for different operation cycles and/or for different battery packs.

BRIEF DESCRIPTION OF THE DRAWING

Preferably, the electronic device comprises a separate sensor for each of the battery packs. Of course, it is also possible that a single sensor is assigned to more than one battery pack. It would even be possible that the electronic device comprises only a single sensor for all of the battery packs. The at least one sensor measures the current value of at least one characteristic parameter of the at least one battery pack and/or the current timer value. A single sensor for all battery packs may be adapted for measuring the at least one characteristic parameter and/or the timer value for all battery packs and/or during all operation cycles.

According to the invention, the battery pack may be of any known type and may have any known electric characteristics. Preferably, each of the battery packs has its dedicated battery management system (BMS) for regulating the battery pack's electric properties (e.g. output current, output voltage, etc.) during energy output (i.e. operation) such that the current temperature value of the battery pack does not exceed a predefined temperature value. The BMS regulates the battery pack's electric properties in order to protect the battery cells of the battery pack from malfunction and/or damage.

Figure 1:
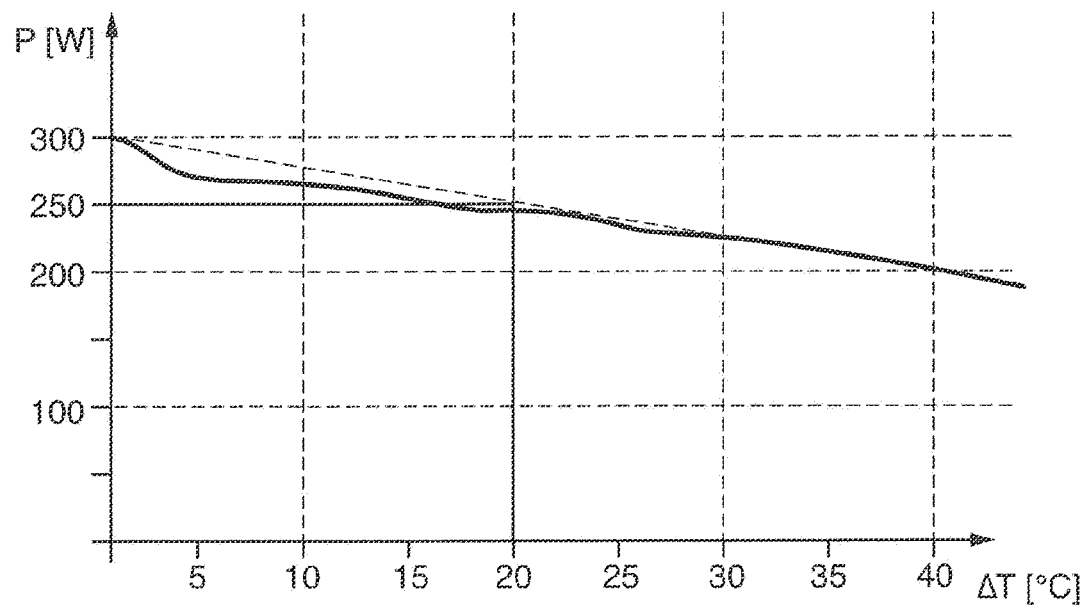

Preferably, the battery packs are of a Li-Ion-type, preferably of a rechargeable Li-Ion-type. The battery packs may be recharged in the electronic device itself if it is equipped with an internal charging apparatus. Alternatively, the battery packs may be removed from the electronic device and charged in an external charging apparatus.

DETAILED DESCRIPTION OF THE BEST MODE OF THE INVENTION

Further, it is suggested that each of the battery packs has a plurality of battery cells interconnected with each other such that each of the battery packs has an output voltage in the range of 6V to 48V, preferably in the range of 12V to 24V. Furthermore, it is suggested that each of the battery packs has a plurality of battery cells interconnected with each other such that each of the battery packs has an electric charge in the range of 1.5 Ah to 5.0 Ah, preferably in the range of 2.5 Ah to 3.2 Ah. Such battery packs are particularly advantageous for us in battery operated hand-held power tools, vacuum cleaners or the like.

Advantageously, each of the battery packs has a battery housing with a positive electric contact and a negative electric contact, both accessible from outside the battery housing, and a plurality of battery cells which are located inside the battery housing and which are interconnected with each other and connected to the positive electric contact and the negative electric contact. The battery cells are encapsulated by the battery housing and can be contacted through the common positive and negative contacts located in or at the battery housing. The battery housing may be made of a rigid or a flexible material. Preferably, the battery housing is made of a plastic material. The advantage is that the battery cells of a battery pack can be handled as a single common unit. This significantly facilitates the handling of the battery cells and allows easy and fast insertion of the battery pack into a casing or housing of the electronic device or attachment of the battery pack to the casing or housing as well as fast extraction or separation therefrom.

Finally, the battery operated electronic device may be any possible device. Preferably, it is suggested that the electronic device is a battery operated vacuum cleaner, a battery operated hand-held polishing machine, a battery operated hand-held sanding machine, or a battery operated grinding machine, a battery operated hand-held drill, a battery operated hand-held electric saw, a battery operated hand-held electric hedge trimmer.

Preferably, operation of the electric motor is switched from the at least one battery pack to the at least other battery pack without interrupting operation of the electric motor. This permits a continuous operation of the electric motor. The switching of the operation of the electric motor is effected automatically and in the background, i.e. unnoticeable to the user of the electronic device. As previously indicated, switching of the operation of the electric motor from the at least one battery pack to the at least one other battery pack is effected based
- on the duration of a current operation cycle of the electric motor by electric energy from the at least one of the battery packs,
- on the electric current drawn from at least one battery pack during a current operation cycle of the electric motor by electric energy from the at least one battery pack, or
- on a current temperature of at least one of the battery packs during a current operation cycle of the electric motor.

BRIEF DESCRIPTION OF THE DRAWING

Figure 2:
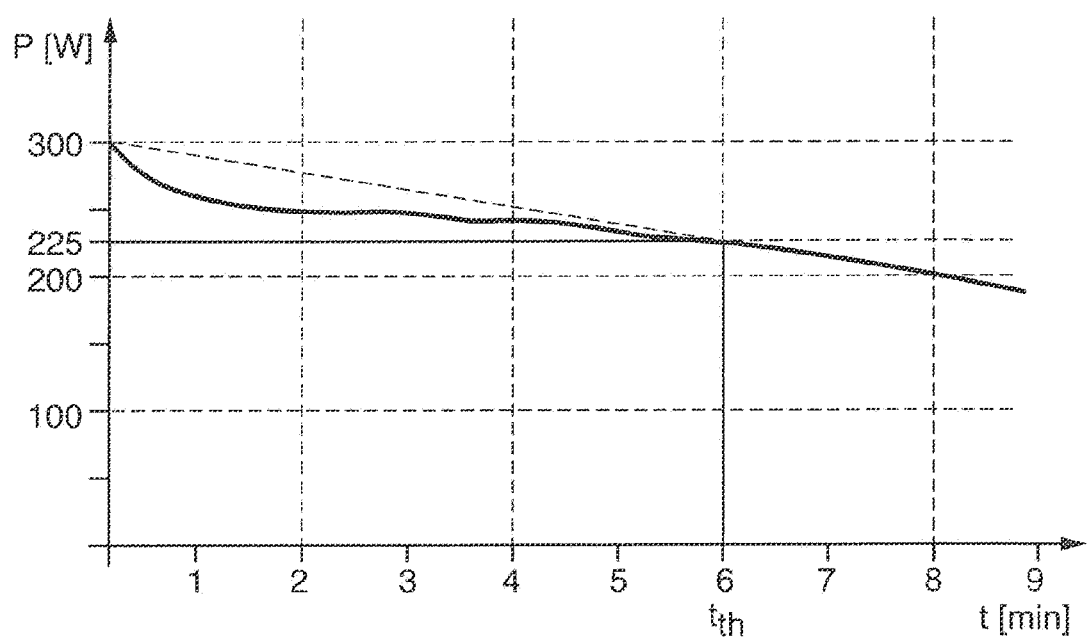
Figure 3:
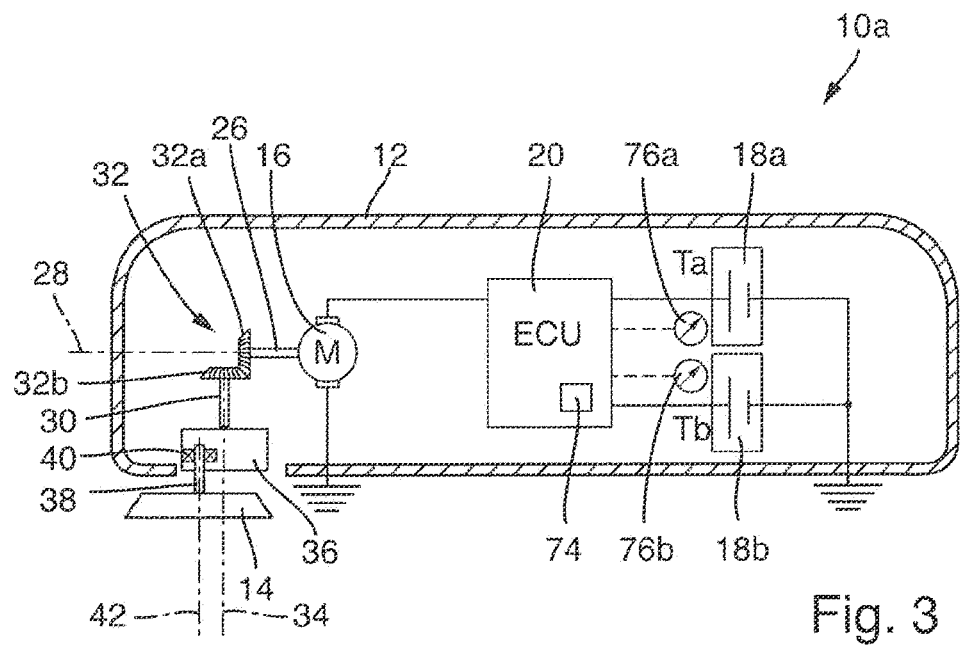
Figure 4:
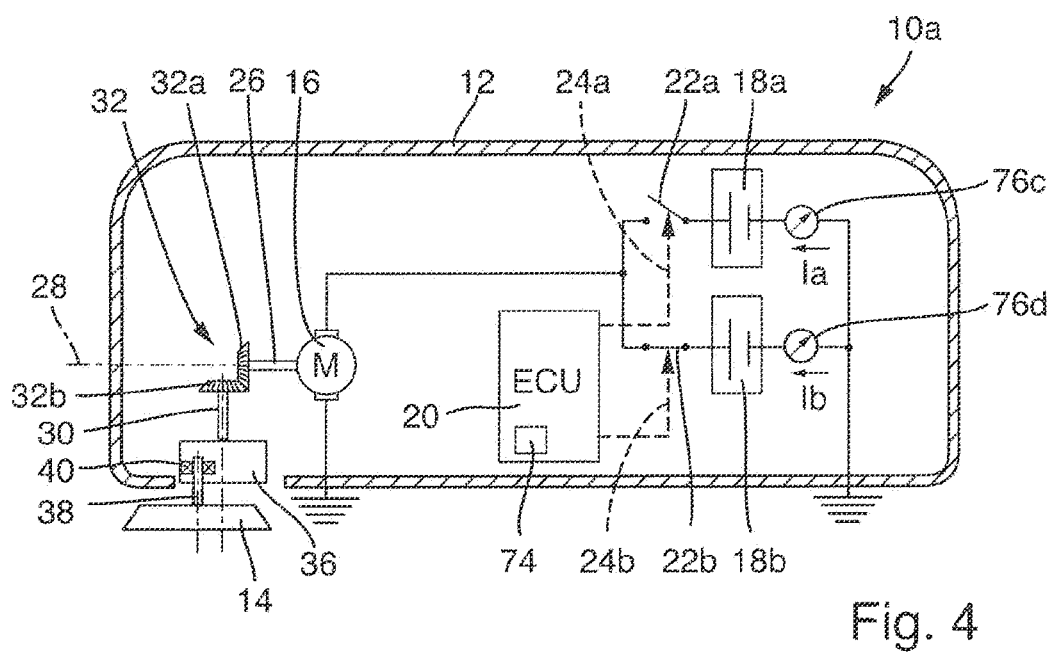
Figure 5:
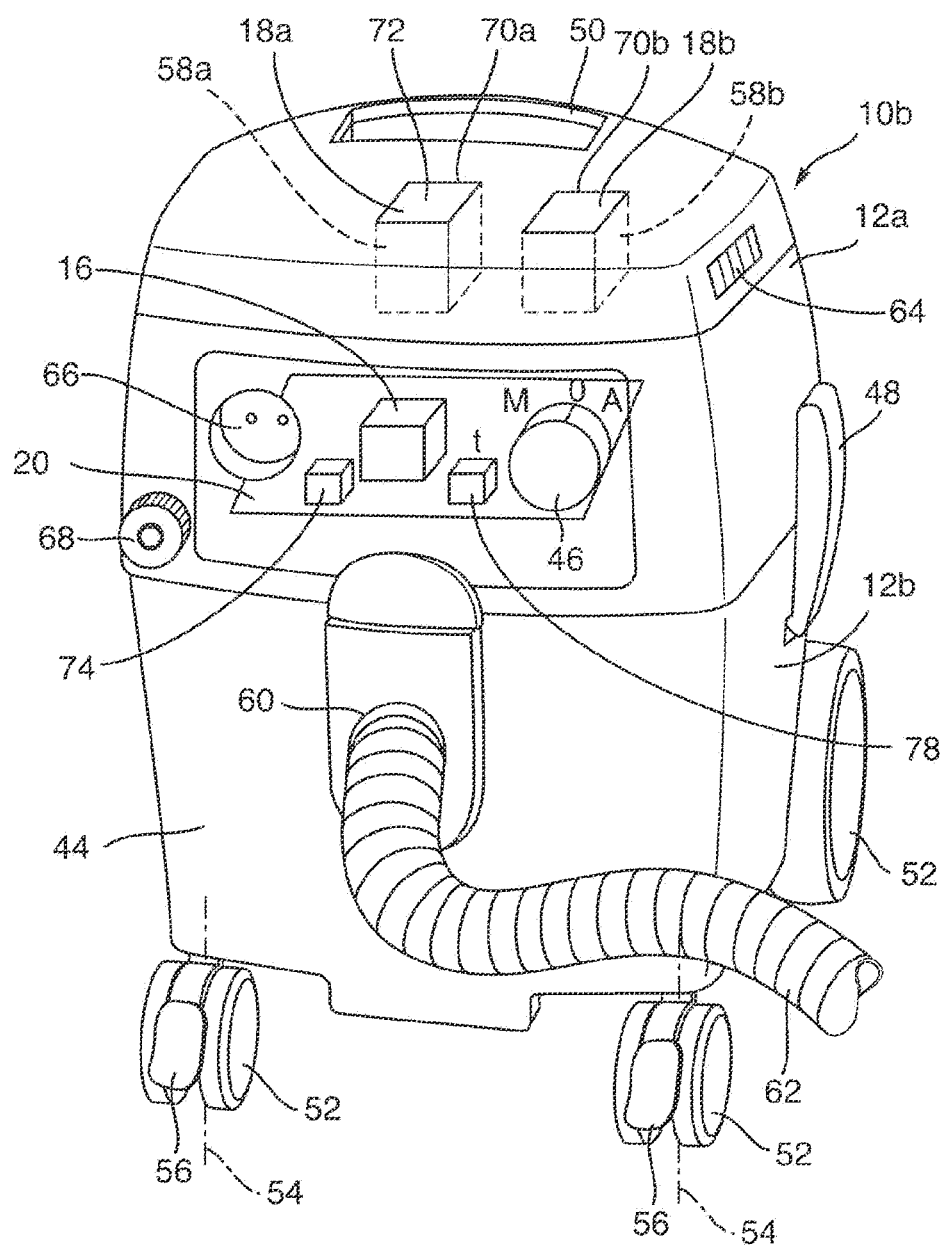
Figures 6, 7:
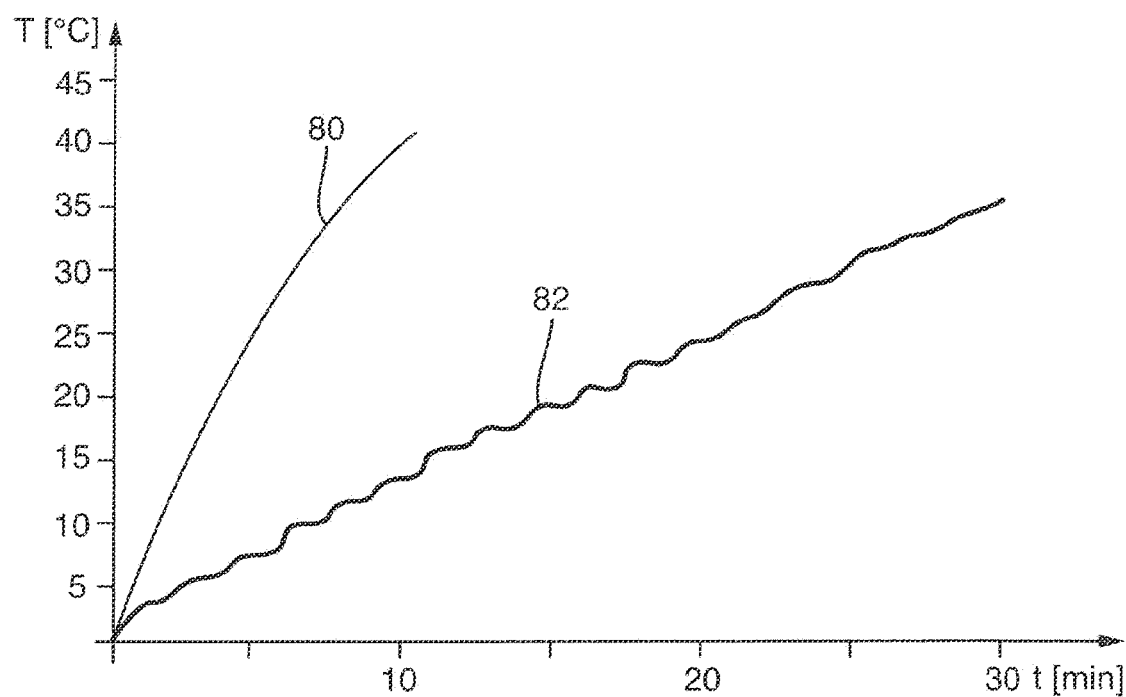

Further features and advantages of the present invention will be described in the more detail hereinafter with reference to the accompanying drawings. It is emphasized that each of the features shown in the various figures may be relevant for the present invention on its own, even if not explicitly mentioned in the respective parts of the description. Furthermore, the features shown in the various figures may be combined with each other in any possible manner, even if such a combination is not explicitly mentioned in the description. The drawings show:

FIG. 1 a diagram showing an output power P of a battery pack of an electronic device according to the present invention depending on a temperature T of the battery pack;

FIG. 2 a diagram showing an output power P of a battery pack of an electronic device according to the present invention depending on a continuous operation time t of the battery pack;

FIG. 3 a schematic view of an example of an electronic device according to a first embodiment of the invention;

FIG. 4 a schematic view of another example of an electronic device according to a second embodiment of the invention;

FIG. 5 a schematic view of a further example of an electronic device according to a third embodiment of the invention;

FIG. 6 an example of a method of operating an electric motor of an electronic device according to the invention by electric energy from at least one of a plurality of battery packs of the electronic device at a time; and FIG. 7 a diagram showing a temperature T of a battery pack of an electronic device according to the present invention compared with a temperature T of a battery pack of a conventional electronic device, both depending on a continuous operation time t of the battery pack.

DETAILED DESCRIPTION OF THE BEST MODE OF THE INVENTION

The present invention refers to a battery-operated electronic device which comprises two or more battery packs and an electric motor which is operated by electric energy from at least one of the battery packs at a time. The battery-operated electronic device can be of any type or design comprising a vacuum cleaner, a hand-held polishing machine, a hand-held sanding machine, or a hand-held grinding machine, a hand-held drill, a hand-held electric saw, a hand-held electric hedge trimmer or the like. The electronic device is in particular of the type where the electric motor is operated for a long period of time at more or less the same rotations (so-called continuous operation in contrast to the intermittent operation of the electric motor).

FIGS. 3 and 4 show an electronic device in the form of a battery operated hand-held random-orbital polisher or eccentric sander 10a. FIG. 5 shows an electronic device in the form of a battery-operated vacuum cleaner 10b. Both electronic devices will be described in more detail below.

FIG. 1 shows a diagram of an outlet power P of an electronic device 10 according to the present invention depending on a temperature T of a battery pack of the electronic device 10. The temperature value shown in the diagram is not an absolute value T, but rather the value $\Delta T$ above ambient temperature (approximately 25° C.). Hence, the absolute temperature T corresponds to T=25° C.+ΔT. The diagram of FIG. 1 represents one battery pack 18 only. It can be clearly seen that the performance (i.e. output power P) of the electric motor 16 decreases continuously as the temperature T of the battery pack 18 increases. The increase of the temperature T may have its reason in chemical, physical and/or electrical properties of the battery pack 18 or of the battery cells of the battery pack 18. The decrease of the output power P may have its reason in chemical, physical and/or electrical properties of the battery pack 18 or of the battery cells of the battery pack 18.

FIG. 2 shows a diagram of an outlet power P of an electronic device 10 according to the present invention depending on a continuous operation time t of a battery pack 18 of the electronic device 10. The diagram of FIG. 2 represents one battery pack 18 only. It can be clearly seen that the performance (i.e. output power P) of the electric motor 16 decreases continuously as the operation time t of the battery pack 18 increases. Drawing a relatively high current from a battery pack 18 over a long period of operation time t can cause the battery pack 18 to heat up. As can be taken from FIG. 1 an increasing temperature T of the battery pack 18 can reduce the output power P of the battery pack 18.

Further, some types of battery packs, for example Li-Ion battery packs, may be equipped with battery management systems (BMS) making an integral part of the battery packs, i.e. located inside a battery housing. The BMS may regulate the battery pack's properties during operation (i.e. energy output) in such a way that specified temperatures of the battery pack are not reached or exceeded. To prevent a battery pack from heating up excessively, the current drawn and/or the voltage supplied (and thus the output power) is limited by the BMS if the temperature of the battery pack reaches or exceeds a pre-defined threshold temperature value. The limitation of power during operation of the battery pack is therefore not necessarily a direct consequence of the technical or chemical properties of the battery cells, but may also be a consequence of the protection functionality of the BMS.

For example, Li-Ion batteries can be generally used in a temperature range of approximately −10° C. to +55° C. However, negative effects on the battery's service life already occur at operating temperatures of above 35° C. For this reason, the BMS may reduce the output current already at temperatures below 55° C., e.g. starting at 40° C., to prevent excessive heating of the battery pack. In practice, however, for example during continuous operation of the battery-powered electronic device this means that after an operation time t of just a few minutes, only a reduced power P is available for the operation of the device (see FIG. 2).

Therefore, the present invention suggests an electronic device where the electronic control unit (ECU) is adapted for switching operation of the electric motor cyclically and consecutively from at least one battery pack of the electronic device to at least one other battery pack of the electronic device. Operation of the electric motor by electric energy from at least one of the battery packs of the electronic device is hereafter referred to as operation cycle. Operation of the electric motor during a given operation cycle can be effected by one or more battery packs contemporarily. When operation of the electric motor is switched to at least one other battery pack of the electronic device, a new operation cycle is initiated. Again, operation of the electric motor during a given operation cycle can be effected by one or more battery packs contemporarily.

In a simple embodiment of the invention, the electronic device has two battery packs which are operated alternately. Preferably, switching of the operation of the electric motor from one battery pack to the other is effected before the output power of the one battery pack reaches or falls below a given power threshold and/or before the temperature of the one battery pack reaches or exceeds a given temperature threshold. If the battery packs are adapted for providing a maximum output power of about 300 W, according to an example the power threshold could be set to 250 W. If the battery cells or the battery packs have a temperature window of proper operation between −10° C. to +55° C., according to an example the temperature threshold $T_{th}$ could be set to an absolute temperature T of +40° C. corresponding to ΔT=+15° C. above the ambient temperature (approximately 25° C.). This is indicated in the example of FIG. 1.

Alternatively, switching of the operation of the electric motor from one battery pack to the other is effected after a continuous operation of the electric motor by electric energy from the one battery pack for a given amount of time. If the output power of the battery packs decreases by approximately 33% after 8 minutes, according to an example, a time threshold could be set to 6 minutes in order to make sure that the output power P of the currently operating one battery pack does not fall below 75% of the maximum output power. If the maximum output power is 300 W (75% would be approximately 225 W) and the output power P decreases to 200 W after 8 minutes, the time threshold $t_{th}$ could be set to 6 min, and the output power of the one battery pack would be at approximately 225 W. This would avoid that the output power falls below 75% of the maximum output power P. This is indicated in the example of FIG. 2.

FIGS. 3 to 5 show various embodiments of an electronic device 10 according to the present invention. In FIGS. 3 and 4 the device 10a is a battery operated power tool, in particular a hand-held random-orbital polisher or an eccentric sander. The device 10a comprises a tool housing 12, preferably made of a rigid material comprising plastics, carbon fibres, metal or the like. Patches of resilient material, preferably made of soft plastics, rubber or the like, may be applied to the rigid material, in order to improve manageability and tangibility of the power tool 10a. A backing plate 14 protrudes beyond the tool housing 12. A sanding member (e.g. abrasive paper or fabric) or a polishing member (e.g. foam pad, wool pad, microfiber pad) may be attached to the bottom surface of the backing plate 14. The electric motor of the electronic device 10a is designated with reference sign 16. The battery packs of the device 10a are designated with reference signs 18a, 18b. In the embodiments of FIGS. 3 and 4, the device 10a has only two battery packs 18. Of course, as already described above, the device 10a could also have more than two battery packs 18. The electronic control unit (ECU) of the device 10a is designated with reference sign 20.

The electric motor 16 drives a motor shaft 26 which rotates about a first rotational axis 28. The rotation of the motor shaft 26 is transmitted to a tool shaft 30 by means of a bevel gear 32. The bevel gear 32 comprises meshing gear wheels 32a, 32b. The bevel gear 32 could be realized as a mechanical gear or as a magnetic gear, where the gear wheels 32a, 32b are realized as magnetic rings having an alternating polarity along their circumference. The tool shaft 30 rotates about a second rotational axis 34. The first and second rotational axes intersect at an angle of >45° and <135°, preferably at an angle between 80° and 100°, in particular an angle of approximately 90°. Attached to the tool shaft 30 in a torque proof manner is an eccentric element 36, which thus rotates together with the tool shaft 30. A guiding pin 38 is attached to the backing plate 14 in a torque proof manner. The guiding pin 38 is guided in the eccentric element 36 by means of at least one bearing 40 in a freely rotatable manner. Thus, the guiding pin 38 is freely rotatable in respect to the eccentric element 36 about a third rotational axis 42. The second and third rotational axes 34, 42 extend parallel and in a distance to each other. A rotation of the tool shaft 30 and the eccentric element 36 results in an eccentric movement of the backing plate 34 about the second rotational axis 34. The free rotation of the backing plate 34 in respect to the eccentric element 36 superimposes the rotational movement about the third rotational axis 42. The superposition of the eccentric movement about the second rotational axis 34 and the free rotational movement about the third rotational axis 42 results in the random-orbital movement of the backing plate 14.

If the backing plate 14 was loosely attached to the tool housing 12, e.g. by means of one or more rubber elements or one or more magnetic elements, the backing pad would perform an eccentric movement only. If the tool shaft 30 was directly attached to the guiding pin 38 in a torque proof manner, the backing plate 14 would perform a purely rotational movement.

The electric motor 16 is operated with electric energy originating from one of the battery packs 18. Operation of the electric motor 16 is cyclically and consecutively switched from one battery pack 18*a* to the other battery pack 18*b*. In FIG. 3 the electric current of both battery packs 18 is applied to the ECU 20, which forwards only the electric current from one of the battery packs 18 to the electric motor 16. To this end, the ECU 20 may be provided with internal switches, preferably semiconductor switches like transistors, thyristors or the like. In that embodiment the ECU 20 is capable of switching the rather large currents of the battery packs 18. In the embodiment of FIG. 4, switches 22*a*, 22*b* are located outside the ECU 20 in the paths between the battery packs 18 and the electric motor 16. The external switches 22 are preferably semiconductor switches like transistors, thyristors or the like. They are controlled by control signals 24*a*, 24*b* generated by the ECU 20. In that embodiment the ECU 20 only has to switch rather small currents of the control signals 24, and the rather large currents of the battery packs 18 are switched by the switches 22.

FIG. 5 shows another example of an electronic device 10*b* in the form of a mobile vacuum cleaner. The vacuum cleaner 10*b* comprises an essentially two-part housing or casing with an upper part 12*a* and a lower part 12*b*. The lower part 12*b* of the casing comprises a dust collection chamber 44 for receiving and storing dust, debris and other small particles which have been filtered out of and extracted from a suction flow of dust-laden air aspirated by the vacuum cleaner 10*b*. The upper part 12*a* of the casing contains among others the at least one electric motor 16 and at least one turbine (not shown) for creating a low pressure or vacuum (i.e. a pressure below the ambient pressure) in the container 44 and for creating the suction flow for the aspiration of dust-laden air. Furthermore, the upper part 12*a* of the casing comprises one or more air filter elements (not shown) for filtering dust, debris and small particles out of the aspirated dust laden air. On the outside of the upper part 12*a* of the casing, a user interface 46 is provided for the operational control of the vacuum cleaner 10*b* and its motor(s) 16. In the shown embodiment, the user interface 46 comprises a control switch for turning on ("A" or "M") and off ("O") the vacuum cleaner 10*b*, for switching between automatic ("A") and manual ("M") operational mode and/or possibly also for manual speed control of the motor(s) 16. The vacuum cleaner 10*b* and its motor(s) 16 are operated by means of electric energy from the battery packs 18, which are preferably rechargeable and can be extracted from the housing or casing 12*a*, 12*b*.

The upper part 12*a* of the casing is releasably attached to the bottom part 12*b* by means of latches 48 located at opposite lateral sides of the casing 12*a*, 12*b*. Of course, the upper part 12*a* could also be attached to the bottom part 12*b* in any other way.

The upper part 12*a* of the casing may be provided with a handle 50 for conveniently carrying the vacuum cleaner 10*b* to its designated site of operation. The handle 50 also serves for lifting off the upper part 12*a* of the casing from the bottom part 12*b*, when the latches 48 are released. The bottom part 12*b* of the casing is provided with wheels 52 so the vacuum cleaner 10*b* can be conveniently rolled over a ground surface, in particular a floor of a room or floor panels, from one position to another. Preferably, the front wheels 52 are pivotable about an essentially vertical pivoting axis 54, in order to allow easy maneuvering of the vacuum cleaner 10*b*. At least one of the wheels 52 preferably comprises a locking brake 56 for temporarily holding the vacuum cleaner 10*b* in its current position on the ground surface. Thus, the vacuum cleaner 10*b* is a mobile unit which can be easily moved to a desired site of operation. Alternatively, the vacuum cleaner 10*b* (with or without wheels 52) could also be positioned on a cart, carriage or trolley provided with wheels and maneuvered over a base surface.

The battery packs 18 may be inserted into respective receptacles 58 provided in the housing or casing 12*a*, 12*b* of the vacuum cleaner 10*b*. Upon insertion of the battery packs 18 into the receptacles 58, they are automatically brought into electric contact with the electronics of the electronic device 10*b*, comprising the electric motor 16 and the ECU 20. Alternatively, the battery packs 18 could also be attached to attachment members at the outside of the housing or casing 12*a*, 12*b* and automatically brought into electric contact with the electronics 16, 20 of the vacuum cleaner 10*b*.

A vacuum generation device of the vacuum cleaner 10*b*, including the one or more motors 16 and the one or more turbines is preferably located entirely in the upper part 12*a* of the casing. The dust collection chamber 44 has an air inlet port 60 to which a suction hose 62 is connected. The air inlet port 60 is located downstream of the vacuum generation device and connects the inside of the dust collection chamber 44 with the environment. A suction nozzle or a vacuum cleaner brush (not shown) may be connected to the distal end of the suction hose 62 opposite to the air inlet port 60. Alternatively, the distal end of the suction hose 62 may be connected to an air outlet port of a hand-held sander, a milling tool, a power drill, a power chisel or any other type of power tool. To this end, the vacuum cleaner 10*b* will aspirate dust, debris and other small particles which are created during intended use of the power tool and collect them in the dust collection chamber 44. Further, the vacuum cleaner 10*b* comprises an exhaust opening 64 for filtered air located upstream of the vacuum generation device and opening into the environment. The filter element(s) are located between the dust collection chamber 44 and an internal suction opening of the vacuum generation device. Preferably, the filter element(s) are located entirely in the upper part 12*a* of the casing. The filter element(s) can be realized as plate-type or ring-type filter(s). They can be removed from the upper part 12a of the casing for cleaning or replacement purposes, preferably after detaching the upper part 12a of the casing from the bottom part 12b.

The upper part 4 of the casing may have a power socket 66 for receiving an electric plug of a power supply line of an electric hand-held power tool, which is pneumatically connected to the vacuum cleaner 10b by means of the suction hose 62. The power socket 66 is preferably in connection with the battery cells of the one or more battery packs 18 for operating the vacuum cleaner 10b and its motor(s) 16.

The power tool draws its electric current for operation of its electric motor from the socket 66. The vacuum cleaner 10b may have a sensing element (e.g. a current sensor) for sensing when the power tool is activated and draws current from the socket 66 and—in particular when the vacuum cleaner 10b is operated in the automatic ("A") operational mode—a switching element (e.g. an electrically controlled switch, in particular a semiconductor switch) for automatically turning on the vacuum cleaner 10b and its motor(s) 16, respectively, when current is drawn through the power socket 66, and turning off the vacuum cleaner 10b and its motor(s) 16, respectively, possibly after a delay, when no current is drawn.

Alternatively, the hand-held power tool, which is in pneumatic connection with the vacuum cleaner 10b through the suction hose 62, and its motor are operated by means of electric power from one or more rechargeable battery cells. The battery cells may be internal battery cells located inside the power tool housing or may make part of one or more extractable battery packs which are releasably attached to or at least partly inside the power tool housing. In the case of a battery operated power tool, there is no electric connection by means of a power supply line between the vacuum cleaner 10b and the power tool, the power socket 66 may be omitted. In order to provide for an automatic activation and deactivation of the vacuum cleaner 10b and its motor(s) 16 when the battery operated power tool is activated, a wireless data communication connection (e.g. Bluetooth, Wi-Fi, NFC, wireless USB, ZigBee or the like) between the power tool and the vacuum cleaner 10b may be established, through which a respective power-on signal and/or power-off signal may be transmitted from the power tool to the vacuum cleaner 10b. To this end, the vacuum cleaner 10b would be equipped with respective wireless communication means (not shown) comprising a receiver for receiving data from the power tool and possibly also a transmitter for transmitting data to the power tool across the wireless connection.

The upper part 12a of the casing may also have an air socket 68 for connecting a pneumatic high-pressure tube of a pneumatically driven hand-held power tool to the vacuum cleaner 10b. The air socket 68 is preferably in connection with an external compressed air supply and provides compressed air for operating the power tool and its pneumatic motor. The power tool draws compressed air for operation of its pneumatic motor from the air socket 68. The vacuum cleaner 10b has a sensing element (e.g. an airflow sensor) for sensing when the power tool draws compressed air from the socket 68 and a switching element for automatically turning on the vacuum cleaner 10b and its motor(s) 16, respectively, when compressed air is drawn, and turning off the vacuum cleaner 10b and its motor(s) 16, respectively, possibly after a delay, when no compressed air is drawn.

As previously mentioned, the vacuum cleaner 10b is operated by electric energy from at least two battery packs 18. Each of the battery packs 18 may comprise one or more battery cells which are electrically connected to each other in series and/or in parallel so that the respective battery pack 18 provides a desired voltage and current, preferably the operating voltage and respective current of the motor 16. The battery packs 18a, 18b are releasably attached to the vacuum cleaner housing 12a, 12b. In the embodiment of FIG. 5, the battery packs 18a, 18b are inserted into openings 70a, 70b which are provided in the vacuum cleaner housing 12a, 12b and received in the receptacles 58a, 58b, into which the openings 70a, 70b open. In the embodiment of FIG. 5, the battery packs 18 are entirely inserted into and received by the receptacles 58. Upon complete insertion of the battery packs 18, the openings 70 are covered or closed by respective lid elements 72, preferably fixedly attached to the battery packs 18. Alternatively, it would also be possible that the battery packs 18 are only partly received by the receptacles 58 or that they are attached to an external part of the vacuum cleaner housing 12a, 12b.

Additionally, the vacuum cleaner 10b may also comprise one or more internal batteries comprising one or more battery cells. The internal batteries are fixed entirely inside the vacuum cleaner housing 12a, 12b and permanently electrically connected to the electronic components (e.g. the ECU 20) of the vacuum cleaner 10b, e.g. by means of soldering, clamping or a plug-and-socket connection. The internal batteries can be removed from the vacuum cleaner housing 12a, 12b only after opening, disassembling or destroying the housing 12a, 12b. Additional steps (e.g. releasing soldered connections by means of a soldering iron, releasing a plug or the like) are most likely required for separating the internal batteries from the electronic components of the vacuum cleaner 10b.

In each of the electronic devices 10a, 10b according to the invention, the switching strategy for switching operation of the electric motor 16 from at least one battery pack 18a; 18b to at least one other battery pack 18b; 18a is realized by the ECU 20. The switching strategy may be realized in hardware in the ECU 20 or, alternatively, it may be realized by software running on a microprocessor 74 of the ECU 20. The microprocessor 74 may be part of a microcontroller.

As previously mentioned, the electric motor 16 is operated in consecutive operation cycles, wherein during two consecutive cycles the electric motor 16 is operated by electric energy from two different battery packs 18, during the first cycle by electric energy from a first battery pack 18a and during the second cycle by electric energy from a second battery pack 18b. It is emphasized that two consecutive operation cycles do not necessarily have to have the same duration. It is possible to switch operation of the electric motor 16 from one battery pack 18 to another after a certain, possibly pre-defined, amount of operation time t with the first battery pack 18a. It is also possible to switch operation of the electric motor 16 from one battery pack 18 to another independently from the operation time with the first battery pack 18a. Instead, a current value of at least one characteristic parameter of at least one of the battery packs 18, preferably of the first battery pack 18a currently providing electric energy to the electric motor 16, could be determined during operation of the electric motor 16, and the operation of the electric motor 16 could be switched to the other battery pack 18b if the determined at least one characteristic parameter has a certain, possibly pre-defined, current value. This will be described in further detail below.

The operation cycle may be in the range of seconds, preferably tens of seconds, or minutes. During an operation cycle all other battery packs 18 currently not in operation are able to cool down and to come closer to their original electric characteristics (e.g. voltage, current, output power), ideally to almost or even completely regain their original electric characteristics. During extensive test drives of electronic devices 10 according to the invention proof has been found that operation cycles of as little as 30 sec are sufficient to cool down the at least one inactive battery pack 18 and to almost regain its original electric characteristics. Of course, operation cycles shorter or longer than 30 sec would be possible, too.

The advantage of the invention is that operation of the electric motor 16 may be switched from one battery pack 18 to another well before the first battery pack 18 has a significantly reduced output current and/or output voltage (and output power P as a product of current and voltage). The reduction of the output current and/or voltage may be a result of technical and/or physical and/or chemical characteristics of the battery cells of the battery packs 18. Alternatively, the reduction of the output current and/or voltage may be a result of an increasing temperature T of the battery pack 18 and may be caused by the BMS of the battery packs 18. After having switched to the other battery pack 18b, the electric motor 16 can be operated for another operation cycle with full power from the other battery pack 18b. Meanwhile, the first battery pack 18a can cool down, regain its original electric (and/or physical and/or chemical) properties and prepare to take over operation of the electric motor 16 later on (i.e. in one of the following operation cycles) with full output power again. With this invention, the electric motor 16 can be continuously operated for a very long time at full power or near full power, without running the risk that the output current and/or the output voltage (and thus the output power P) of the battery pack 18 currently providing electric current and operating the electric motor 16 is reduced with ongoing operation time, for instance caused by the BMS in order to protect the battery pack 18.

A significant reduction of the output current or output voltage may be reached if they decrease by more than 30%, preferably already if they decrease by more than 20%, particularly preferred by more than 10%. During operation of the battery pack 18 the output current and the output voltage may be reduced by different percentages. Therefore, a threshold for the significant reduction may be set to different values for the output voltage and the output current. For example, a significant reduction of the voltage may correspond to a reduction by more than 10% and a significant reduction of the current may correspond to a reduction by more than 20%. The significance of reduction of the output power P is usually higher. Therefore, a significant reduction of the output power P may be reached if it decreases by more than 35%, preferably by more than 25%, particularly preferable by more than 20%. As mentioned above, it is advantageous to switch from one battery pack 18 to another before the output power P of the currently used battery pack 18 is reduced by more than the indicated significant reduction.

In a simple embodiment, the electronic device 10 has only two battery packs 18 and operation of the electric motor 16 is simply switched back and forth between the two battery packs 18. However, it would just as well be possible that the electronic device 10 has more than two battery packs 18, for example three, four or five battery packs 18, which may increase the amount of time available for cooling down those battery packs 18 which currently do not provide current to the electric motor 16. Furthermore, in case of more than two battery packs 18, it would also be possible that more than one battery pack 18 provides current and operates the electric motor 16. For example, with three battery packs 18, the electric motor 16 may be operated in a first operation cycle by two of the battery packs 18, and in a subsequent second cycle by only one battery pack 18, and in a subsequent cycle by two battery packs 18 of the first cycle again, and so on. It would even be possible that the electric motor is operated by two of the three battery packs 18 at all times and that switching of the battery packs 18 is effected offset to one another. For example, in a first operation cycle, battery packs #1 and #2 operate the electric motor 16, in a second cycle battery packs #1 and #3 operate the electric motor 16, in a third cycle batteries #2 and #3 operate the electric motor 16 and then operation of the motor 16 is switched back to the first cycle.

According to a further example, with four battery packs 18 (18.1, 18.2, 18.3, 18.4), the electric motor 16 may be operated in a first operation cycle by two of the battery packs 18.1, 18.2, and in a subsequent second cycle by the other two battery packs 18.3, 18.4 and so on. Of course, with four battery packs 18, the above described offset operation of the electric motor 16 would also be possible resulting in the following operating battery packs 18 at six consecutive cycles: #1, #2-#1, #3-#2, #3-#2, #4-#3, #4-#1, #4. Each of the battery packs 18 is operated during three of the operation cycles and in a cooling or regeneration mode during the other three of the operation cycles. Alternatively, as shown in FIG. 6, the above described offset operation of the electric motor 16 could also comprise the following operating battery packs at four consecutive operation cycles: #1, #2-#1, #3-#2, #4-#3, #4. In this embodiment, each of the battery packs 18 is operated during two of the operation cycles and in a cooling or regeneration mode during the other two of the operation cycles. Many other variations of the general idea of cyclically and consecutively switching operation of the electric motor 16 from at least one of the battery packs 18 of the electronic device 10 to at least one other battery pack 18 are conceivable It is suggested that the electronic device comprises at least one sensor 76 adapted for determining a current (i.e. momentaneous or present) value of at least one characteristic parameter of at least one of the battery packs 18 and for forwarding the at least one determined characteristic parameter to the electronic control unit 20. The electronic control unit 20 is adapted for switching operation of the electric motor 16 cyclically and consecutively from at least one battery pack 18a; 18b to at least one other battery pack 18b; 18a, wherein the switching depends on the determined current value of the at least one characteristic parameter of the at least one battery pack 18. To this end, one or more characteristic parameters of the at least one battery pack 18 are monitored by means of a respective sensor 76. The characteristic parameters are in particular electronic properties of the battery packs 18, e.g. an electric current drawn from the battery pack 18 during an operation cycle of the electric motor 16, a voltage supplied by the battery pack 18, an electric power supplied by the battery pack 18, an electric resistance of the battery pack 18 or the like. Alternatively, the at least one sensor 76 could also be adapted for determining non-electric properties of the at least one battery pack 18, like its current operation temperature or its operation time in the current operation cycle. The current value of the at least one characteristic parameter of at least one of the battery packs 18, which is determined by the at least one sensor 76, may then be used for determining an appropriate point in time for switching operation of the electric motor 16 from the at least one battery pack 18a to the at least one other battery pack 18b.

Preferably, as shown in FIG. 4, the at least one sensor 76c, 76d is adapted for determining a current value of at least one characteristic parameter indicative of the current temperature T of the at least one battery pack 18. The electronic control unit 20 is adapted for determining the current temperature T of the at least one battery pack 18 based on the determined current value of the at least one characteristic parameter indicative of the current temperature T of the at least one battery pack 18. The electronic control unit 20 is adapted for switching operation of the electric motor 16 cyclically and consecutively from the at least one battery pack 18a; 18b to the at least one other battery pack 18b; 18a depending on the determined current temperature value T of the at least one battery pack 18. To this end it is suggested that the switching of the operation of the electric motor 16 from the at least one battery pack 18a; 18b to the at least one other battery pack 18b; 18a is effected depending on the current temperature T of the at least one battery pack 18. The temperature of the at least one battery pack 18 is not determined directly by means of one or more temperature sensors, like temperature sensors 76a 76b in FIG. 3, but instead from a characteristic parameter of the at least one battery pack 18, which is indicative of the temperature T of the at least one battery pack 18. Determination of the temperature T may be effected by calculation or by estimation of the temperature T from the characteristic parameter. To this end, the electronic control unit 20 may access a characteristic map in which electrical properties of the battery packs 18 and the relationship between the electrical properties and the current temperature T of the battery packs 18 are stored. Furthermore, the calculation can be effected with the help of one or more equations which reflect the interrelationships between the electrical properties and the current temperature T of the battery packs 18. In case the at least one battery pack 18 comprises more than one battery pack 18a, 18b, it may be sufficient to determine the temperature T of only one of the battery packs 18.

Preferably, switching of the operation of the electric motor 16 from the at least one battery pack 18a; 18b to the at least one other battery pack 18b; 18a is effected if the temperature T of the at least one battery pack 18 reaches or exceeds a given temperature threshold $T_{th}$, preferably a pre-defined temperature threshold $T_{th}$. The temperature threshold $T_{th}$, is defined based on the characteristics of the battery packs 18, their battery cells and/or their BMS.

For instance, as shown in FIG. 1, if the battery cells of a battery pack 18 are of the Li-Ion type, the output power P of the battery pack 18 at ambient temperature ($\Delta T=0°$ C. in FIG. 1) and during continuous operation will decrease more or less linearly over time, e.g. by 4-5% per+5° K. If the output power P of a battery pack 18 at the starting temperature of $\Delta T=0°$ K above ambient temperature (approximately 25° C.) is 300 W, the output power P may decrease by approximately 12.5 W each increase of the battery pack temperature T by 5° K. If an output power P of below 250 W is to be avoided, the battery pack 18a may be deactivated and operation of the electric motor 16 switched to another battery pack 18b if a temperature of $\Delta T=20°$ K above ambient temperature, i.e. an absolute temperature of approximately T=45° C., has been reached or exceeded. In that example the temperature threshold $T_{th}$ is predefined at T=45° C. or $\Delta T=20°$ K for each operation cycle. Of course, different threshold values $T_{th}$ may be defined for different operation cycles and/or for different battery packs 18.

It is further suggested that the at least one sensor 76 comprises at least one electric current sensor 76c, 76d (see FIG. 4) for sensing a current electric current value $I_a$, $I_b$ of the at least one battery pack 18a, 18b. The measured electric current value $I_a$, $I_b$ is transmitted from the sensors 76c, 76d to the ECU 20 by means of at least one wire, a databus or a wireless connection. The connection between the sensors 76c, 76d and the ECU 20 is not shown in FIG. 4. The electronic control unit 20 is adapted for determining an electric current I drawn over time t from the at least one battery pack 18a, 18b during an operation cycle of the electric motor 16. The electronic control unit 20 is further adapted for determining the current temperature value T of the at least one battery pack 18 based on the determined electric current I drawn over time t from the at least one battery pack 18a, 18b during the operation cycle of the electric motor 16. In order to determine the electric current I drawn over time t during an operation cycle of the at least one battery pack 18a, 18b, the determined current values $I_a$, $I_b$ of the electric current drawn from the at least one battery pack 18a, 18b may be integrated over time t, wherein t is the duration of the current operation cycle. The overall amount of electric current I drawn from the at least one battery pack 18a, 18b over time t is indicative of the current temperature T of the at least one battery pack 18. The higher the value of electric current I drawn from the at least one battery pack 18a, 18b over time t is, the higher the temperature T of the at least one battery pack 18 will be.

In another embodiment shown in FIG. 3, it is suggested that the at least one sensor 76 comprises at least one temperature sensor 76a, 76b for determining a current (i.e. momentaneous or present) temperature value $T_a$, $T_b$ of the at least one battery pack 18. The temperature sensors 76a, 76b are preferably located in the vicinity of the battery packs 18, the temperature $T_a$, $T_b$ of which they are to measure. The measured temperature value $T_a$, $T_b$ is transmitted from the sensors 76a, 76b to the ECU 20 by means of at least one wire, a databus or a wireless connection. The electronic control unit 20 is adapted for switching operation of the electric motor 16 cyclically and consecutively from one battery pack 18a; 18b to another battery pack 18b; 18a depending on the determined current temperature value $T_a$, $T_b$ of the at least one battery pack 18. In this embodiment, the temperature $T_a$, $T_b$ of the at least one battery pack 18 is determined directly by means of one or more temperature sensors 76a, 76b.

Of course, when determining the points in time for switching operation of the electric motor 16 from at least one battery pack 18a; 18b to at least one other battery pack 18b; 18a, a current value of the ambient temperature may be taken into consideration, too. In that case, the electronic device 10, in particular its electronic control unit 20, is equipped with a temperature sensor (not shown) for measuring the current ambient temperature, and for forwarding the measured current ambient temperature value to the electronic control unit 20 for further processing.

According to another embodiment of the invention, which is shown in FIG. 5, it is suggested that the electronic device 10, in particular the ECU 20, comprises a timer 78, which is reset at the beginning of each operation cycle of the electric motor 16 and which runs during the operation cycle of the electric motor 16. The electronic control unit 20 is adapted for monitoring the current value t of the timer 78 during the current operation cycle of the electric motor 16 and to switch operation of the electric motor 16 from the at least one battery pack 18a; 18b currently operating the electric motor 16 to at least one other battery pack 18b; 18a after the timer 78 has reached or exceeded a pre-defined timer value $t_{th}$. The timer 78 may be designed as an integral part of the electronic control unit 20. It may be realized in hardware or in software. When switching operation of the electric motor 16 to the at least one other batter pack 18b; 18a, and thus starting a new operation cycle, the timer 78 is reset, preferably to zero, and restarted to run again during the new operation cycle.

For instance, as shown in FIG. 2, if the battery cells of a battery pack 18 are of the Li-Ion type, the output power P of the battery pack 18 at ambient temperature and during continuous operation will decrease more or less linearly over time, e.g. by 4-5% per minute. If the output power P of a battery pack 18 at the starting time t=0 is 300 W, the output power P may decrease by approximately 12, 5 W each minute. If an output power P of below 225 W is to be avoided, the currently operated battery pack 18a; 18b may be deactivated and operation of the electric motor 16 switched to another battery pack 18b; 18a after 6 minutes. In this example the time threshold $t_{th}$ is predefined or set at 6 minutes for each operation cycle. Of course, different threshold values $t_{th}$ may be defined for different operation cycles and/or for different battery packs 18.

Preferably, the electronic device 10 comprises a separate sensor 76a, 76b; 76c, 76d for each of the battery packs 18. Of course, it is also possible that a single sensor 76 is assigned to more than one battery pack 18. It would even be possible that the electronic device 10 comprises only a single sensor 76 for all of the battery packs 18. The at least one sensor measures the current value of at least one characteristic parameter of the at least one battery pack 18 and/or the current timer value. A single sensor 76 for all battery packs 18 may be adapted for measuring the at least one characteristic parameter and/or the timer value for all battery packs 18 and/or during all operation cycles.

Preferably, operation of the electric motor 16 is switched from the at least one battery pack 18a; 18b to the at least other battery pack 18b; 18a without interrupting operation of the electric motor 16. This permits a continuous operation of the electric motor 16. The switching of the operation of the electric motor 16 is effected automatically and in the background, i.e. unnoticeable to the user of the electronic device 10.

Furthermore, FIG. 7 shows the effectiveness of the present invention. Reference sign 80 indicates the temperature-curve of a battery pack 18 of a conventional electronic device 10, where the electric motor 16 is continuously operated by electric energy drawn from the same battery pack 18. It can be clearly seen that after a rather short amount of time, e.g. after 10 minutes, of continuous operation, the battery pack 18 has reached a critical temperature of approximately 40° C.-45° C. The consequence is that the battery pack 18—possibly caused by the BMS—outputs only a reduced amount of electric power P and—eventually—is even shut down completely. In contrast thereto, reference sign 82 indicates the temperature-curve of a battery pack 18 of an electronic device 10 according to the present invention, where operation of the electric motor 16 is cyclically and consecutively switched among at least two battery packs 18. In this case, the electronic device 10 has three battery packs 18, which are operated cyclically consecutively one after the other. Thus, each battery pack 18 has an operation cycle of 33% of the overall operation of the electric motor 16. The duration of an operation cycle has been set to 1 minute. The curve 82 shows the temperature of only one of the battery packs 18. The temperature curves of the other battery packs 18 are similar if not identical. It can be clearly seen from curve 82 that even after a rather long continuous operation of the electric motor 16 of 30 minutes, the critical temperature of 40° C.-45° C. has not yet been reached. Quite to the contrary, the temperature T of the battery pack 18 is still below 30° C. Consequently, the battery pack 18 will output the maximum power P for the entire 30 minutes of continuous operation of the electric motor 16.

The invention claimed is:

1. Electronic device (10; 10a; 10b) comprising two or more battery packs (18a, 18b), an electric motor (16) which is operated by electric energy from at least one of the two or more battery packs (18a; 18b) at a time, and an electronic control unit (20) for controlling operation of the electric motor (16), wherein the electronic control unit (20) is adapted for switching operation of the electric motor (16) cyclically and consecutively from at least one battery pack (18a; 18b) of the electronic device (10; 10a; 10b) to at least one other battery pack (18b; 18a) of the electronic device (10; 10a; 10b);

the electronic device (10; 10a; 10b) comprises at least one sensor (76) adapted for determining a current value of at least one characteristic parameter of at least one of the two or more battery packs (18a; 18b) and for forwarding the at least one characteristic parameter determined to the electronic control unit (20);

the electronic control unit (20) is adapted for switching operation of the electric motor (16) cyclically and consecutively from the at least one battery pack (18a; 18b) to the at least one other battery pack (18b; 18a) depending on the current value determined of the at least one characteristic parameter of the at least one battery pack (18a; 18b);

the at least one sensor (76) is adapted for determining a current temperature value ($T_a$, $T_b$) of at least one characteristic parameter indicative of a current temperature of the at least one battery pack (18a; 18b);

the electronic control unit (20) is adapted for determining the current temperature value ($T_a$, $T_b$) of the at least one battery pack (18a; 18b) based on a sensed current value of the at least one characteristic parameter indicative of the current temperature ($T_a$, $T_b$) of the at least one battery pack (18a; 18b);

the electronic control unit (20) is adapted for switching operation of the electric motor (16) cyclically and consecutively from the at least one battery pack (18a; 18b) to the at least one other battery pack (18b; 18a) depending on the current temperature value ($T_a$, $T_b$) of the at least one battery pack (18a; 18b);

the at least one sensor (76) comprises at least one electric current sensor (76c; 76d) for determining a current electric current value ($I_a$, $I_b$) of the at least one battery pack (18a; 18b);

the electronic control unit (20) is adapted for determining an electric current (I) drawn over time (t) from the at least one battery pack (18a; 18b) during an operation cycle of the electric motor (16); and the electronic control unit (20) is adapted for determining the current temperature value ($T_a$; $T_b$) of the at least one battery pack (18a; 18b) based on the electric current (I) determined drawn over the time (t) from the at least one battery pack (18a; 18b) during an operation cycle of the electric motor (16).

2. Electronic device (10; 10a; 10b) according to claim 1, wherein the at least one sensor (76) comprises at least one temperature sensor (76a; 76b) for determining the current temperature value ($T_a$; $T_b$) of the at least one battery pack (18a; 18b), and the electronic control unit (20) is adapted for switching operation of the electric motor (16) cyclically and consecutively from the at least one battery pack (18a; 18b) to the at least one other battery pack (18b; 18a) depending on the current temperature value ($T_a$; $T_b$) determined of the at least one battery pack (18a; 18b).

3. Electronic device (10; 10a; 10b) according to claim 1, wherein
the electronic device (10) comprises a separate sensor (76) for each of the two or more battery packs (18a; 18b).

4. Electronic device (10; 10a; 10b) according to claim 1, wherein
the electronic device (10) comprises a timer (78) which is reset at the beginning of each operation cycle of the electric motor (16) and which runs during the operation cycle of the electric motor (16) and
the electronic control unit (20) is adapted for monitoring a current timer value (t) of the timer (78) during the operation cycle of the electric motor (16) and to switch operation of the electric motor (16) from the at least one battery pack (18a; 18b) currently operating the electric motor (16) to the at least one other battery pack (18b; 18a) after the timer (78) has reached or exceeded a pre-defined timer value ($t_{th}$).

5. Electronic device according to claim 1, wherein
the two or more battery packs (18a, 18b) are of Li-Ion-type, including of a rechargeable Li-Ion-type.

6. Electronic device (10; 10a; 10b) according to claim 1, wherein
each of the two or more battery packs (18a, 18b) has a plurality of interconnected battery cells such that each of the two or more battery packs (18a, 18b) has a respective output voltage in a range of 6V to 48V, including in the range of 12V to 24V.

7. Electronic device (10; 10a; 10b) according to claim 1, wherein
each of the two or more battery packs (18a, 18b) has a plurality of interconnected battery cells such that each of the two or more battery packs (18a, 18b) has a respective electric charge in a range of 1.5 Ah to 5.0 Ah, including in the range of 2.5 Ah to 3.2 Ah.

8. Electronic device (10; 10a; 10b) according to claim 1, wherein
the electronic device (10) is a battery operated vacuum cleaner (10b), a battery operated hand-held polishing machine (10a), a battery operated hand-held sanding machine (10a), a battery operated grinding machine, a battery operated hand-held drill, a battery operated hand-held electric saw, or a battery operated hand-held electric hedge trimmer.

9. Electronic device (10; 10a; 10b) according to claim 1, wherein
the at least one sensor (76) comprises at least one temperature sensor (76a; 76b) for determining a current temperature value ($T_a$; $T_b$) of the at least one battery pack (18a; 18b), and
the electronic control unit (20) is adapted for switching operation of the electric motor (16) cyclically and consecutively from the at least one battery pack (18a; 18b) to the at least one other battery pack (18b; 18a) depending on the current temperature value ($T_a$; $T_b$) determined of the at least one battery pack (18a; 18b).

10. Electronic device (10; 10a; 10b) according to claim 1, wherein the electronic device (10) comprises a separate sensor (76) for each of the two or more battery packs (18a; 18b).

11. Electronic device according to claim 1, wherein
the two or more battery packs (18a, 18b) are of Li-Ion-type, including of a rechargeable Li-Ion-type.

12. Electronic device (10; 10a; 10b) according to claim 1, wherein
each of the two or more battery packs (18a, 18b) has a plurality of interconnected battery cells such that each of the two or more battery packs (18a, 18b) has a respective output voltage in a range of 6V to 48V, including in the range of 12V to 24V.

13. Electronic device (10; 10a; 10b) comprising two or more battery packs (18a, 18b), an electric motor (16) which is operated by electric energy from at least one of the two or more battery packs (18a; 18b) at a time, and an electronic control unit (20) for controlling operation of the electric motor (16), wherein
the electronic control unit (20) is adapted for switching operation of the electric motor (16) cyclically and consecutively from at least one battery pack (18a; 18b) of the electronic device (10; 10a; 10b) to at least one other battery pack (18b; 18a) of the electronic device (10; 10a; 10b);
each of the two or more battery packs (18a, 18b) has its dedicated battery management system that regulates the battery pack's properties including power output during operation of the battery pack (18a; 18b) in such a way that specified temperatures of the two or more battery packs (18a, 18b) are not exceeded, by limiting the output power drawn from the battery pack (18a; 18b) if the temperature of the battery pack (18a; 18b) rises, and
the electronic control unit (20) is adapted for switching operation of the electric motor (16) from the at least one of the battery packs (18a) to the at least one other battery pack (18b) before the battery management system of the at least one battery pack (18a) reduces the output power of the at least one battery pack (18a).

14. Electronic device (10; 10a; 10b) according to claim 13, wherein the battery management systems make an integral part of the two or more battery packs (18a, 18b).

15. Electronic device (10; 10a; 10b) comprising two or more battery packs (18a, 18b), an electric motor (16) which is operated by electric energy from at least one of the two or more battery packs (18a; 18b) at a time, and an electronic control unit (20) for controlling operation of the electric motor (16), wherein
the electronic control unit (20) is adapted for switching operation of the electric motor (16) cyclically and consecutively from at least one battery pack (18a; 18b) of the electronic device (10; 10a; 10b) to at least one other battery pack (18b; 18a) of the electronic device (10; 10a; 10b); and
each of the two or more battery packs (18a, 18b) has a respective dedicated battery management system (BMS) for regulating each battery pack's electric properties during energy output such that a respective current temperature value (T) of a respective battery pack (18a, 18b) does not exceed a predefined temperature value ($T_{th}$).

16. Electronic device (10; 10a; 10b) comprising two or more battery packs (18a, 18b), an electric motor (16) which is operated by electric energy from at least one of the two or more battery packs (18*a*; 18*b*) at a time, and an electronic control unit (20) for controlling operation of the electric motor (16), wherein the electronic control unit (20) is adapted for switching operation of the electric motor (16) cyclically and consecutively from at least one battery pack (18*a*; 18*b*) of the electronic device (10; 10*a*; 10*b*) to at least one other battery pack (18*b*; 18*a*) of the electronic device (10; 10*a*; 10*b*);

the electronic device (10; 10*a*; 10*b*) comprises at least one sensor (76) adapted for determining a current value of at least one characteristic parameter of at least one of the two or more battery packs (18*a*; 18*b*) and for forwarding the at least one characteristic parameter determined to the electronic control unit (20);

the electronic control unit (20) is adapted for switching operation of the electric motor (16) cyclically and consecutively from the at least one battery pack (18*a*; 18*b*) to the at least one other battery pack (18*b*; 18*a*) depending on the current value determined of the at least one characteristic parameter of the at least one battery pack (18*a*; 18*b*); and each of the two or more battery packs (18*a*, 18*b*) has a respective dedicated battery management system (BMS) for regulating each battery pack's electric properties during energy output such that a respective current temperature value (T) of a respective battery pack (18*a*, 18*b*) does not exceed a predefined temperature value ($T_{th}$).

17. Method for controlling operation of an electric motor (16) of an electronic device (10; 10*a*; 10*b*), wherein the electronic device (10; 10*a*; 10*b*) comprises two or more battery packs (18*a*, 18*b*) and wherein the electric motor (16) is operated by electric energy from at least one of the two or more battery packs (18*a*; 18*b*), wherein operation of the electric motor (16) is cyclically and consecutively switched from at least one battery pack (18*a*; 18*b*) of the electronic device (10; 10*a*; 10*b*) to at least one other battery pack (18*b*; 18*a*) of the electronic device (10; 10*a*; 10*b*), each of the two or more battery packs (18*a*, 18*b*) has its dedicated battery management system that regulates the battery pack's properties including power output during operation of the battery pack (18*a*; 18*b*) in such a way that specified temperatures of the two or more battery packs (18*a*, 18*b*) are not exceeded, the output power drawn from a battery pack (18*a*; 18*b*) is limited by the battery management system if the temperature of the battery pack (18*a*; 18*b*) rises, and the electronic control unit (20) switches operation of the electric motor (16) from the at least one of the two or more battery packs (18*a*) to the at least one other battery pack (18*b*) before the battery management system of the at least one battery pack (18*a*) reduces the output power of the at least one battery pack (18*a*).

18. Method according to claim 17, wherein the method comprises effecting switching of the operation of the electric motor (16) from the at least one battery pack (18*a*; 18*b*) to the at least one other battery pack (18*b*; 18*a*) based on the electric current ($I_a$; $I_b$) drawn from the at least one of the two or more battery packs (18*a*; 18*b*) during a current operation cycle of the electric motor (16).

\* \* \* \* \*